United States Patent [19]

Nishino

[11] Patent Number: 5,831,841
[45] Date of Patent: Nov. 3, 1998

[54] CONTACTLESS POWER DISTRIBUTION SYSTEM

[75] Inventor: Shuzo Nishino, Kawanishi, Japan

[73] Assignee: Diafuku Co., Ltd., Osaka, Japan

[21] Appl. No.: 901,726

[22] Filed: Jul. 28, 1997

[30]   Foreign Application Priority Data

Aug. 2, 1996  [JP]  Japan ..................................... 8-204018
Sep. 26, 1996 [JP]  Japan ..................................... 8-254050

[51] Int. Cl.$^6$ ................................................. H02M 5/45
[52] U.S. Cl. .............................. 363/37; 307/10.1; 191/10
[58] Field of Search ............................... 363/37; 191/10; 307/10.1; 318/16; 336/119, 178

[56]          References Cited

U.S. PATENT DOCUMENTS

| | | | |
|---|---|---|---|
| 5,293,308 | 3/1994 | Boys et al. ............................. | 363/37 |
| 5,528,113 | 6/1996 | Boys et al. ............................. | 191/6 |
| 5,669,470 | 9/1997 | Ross ...................................... | 191/10 |

*Primary Examiner*—Shawn Riley
*Attorney, Agent, or Firm*—Barnes, Kisselle, Paisch, Choate, Whittemore & Hulbert, PC

[57]          ABSTRACT

A primary inductive path to which a high-frequency current is supplied from a power supply is laid along a guide rail for carrying car bodies and secondary electric power receiving circuit for receiving electric power from the primary inductive path in a contactless mode are disposed in the car bodies. Inductance in the primary inductive path is adjusted by disposing, in the power supply, a dummy inductor which is composed by overlapping a plurality of planar ferrite cores with gaps reserved so as to form a plurality of ferrite blocks and combining these ferrite blocks so as to form at centers thereof a run-through slot for passing the primary inductive path. Further, the secondary electric power receiving circuit is composed of a pick-up coil in which an electromotive force is generate by a magnetic flux produced by the primary inductive path, a capacitor which composes, together with the pick-up coil, a resonant circuit resonating with a frequency in the primary inductive path, a rectifier circuit connected to the capacitor, and a constant-voltage control circuit which is connected to the rectifier circuit and controls an output voltage to a standard voltage, and uses standard voltage generators which set the standard voltage of the constant-voltage control circuit at two steps in proportion to a load electric power as well as a controller for switching the standard voltage generators.

6 Claims, 9 Drawing Sheets

FIG. 7

CONTACTLESS POWER DISTRIBUTION SYSTEM

FIELD OF THE INVENTION

The present invention relates to a contactless power distribution system which supplies electric power in a contactless mode to vehicles which run while being guided by a rail.

BACKGROUND OF THE INVENTION

A power distribution system disclosed by U.S. Pat. No. 5,293,308 is known as an example of conventional contactless power distribution systems.

In this system, a primary conductive path to which a high-frequency sinusoidal wave current is supplied is laid along a path for moving vehicles and secondary power receiving circuits for receiving electric power in a contactless mode from the primary inductive path are disposed in the vehicles.

The secondary power receiving circuit is composed of a pick-up coil in which an electromotive force is generated by a magnetic flux of the primary inductive path, a capacitor which composes a resonant circuit resonating, together with the pick-up coil, with a frequency of the current in the primary inductive path, a rectifier circuit connected to both ends of the capacitor, and a constant-voltage control circuit which controls an output voltage from the rectifier circuit to a standard voltage and supplies it to a load such as a motor of the vehicle.

The constant-voltage control circuit is composed of a current limiting coil, a voltage generator which generates the standard voltage, a comparator which compares the output voltage from the constant-voltage control circuit with the standard voltage from the voltage generator, a switching element for output adjustment which is turned on by the comparator for turning off the output voltage when the output voltage exceeds the standard voltage, and a diode and a capacitor which compose a filter. The standard voltage is set at a high level on an assumption that electric power is supplied to all loads. Electric power supplied the loads is increased by enhancing an operating voltage, i.e., the standard voltage.

In the contactless power distribution system having the configuration described above, a sinusoidal wave current having a high frequency, for example, of 10 kHz is supplied to the primary inductive path, a magnetic flux produced in the primary inductive path generates a strong electromotive force in the pick-up coils of the vehicles resonating with the frequency in the primary inductive path, an AC current produced by the electromotive force is rectified the rectifier circuit, controlled by the constant-voltage circuit to a predetermined output voltage and supplied to the motors used as the loads, and the vehicles are moved by the motors along the moving path. When the loads are reduced and the output voltage of the constant-voltage control circuit is enhanced until it exceeds the standard voltage, the constant-voltage control circuit turns on the switching element, thereby lowering the output voltage to maintain it at the standard voltage.

Further, ring-like ferrite cores having gaps are disposed around the primary inductive path as dummy inductors for adjusting an inductance dependently on a number of the ring-like ferrite cores disposed around the primary inductive path.

In the contactless power distribution system, the dummy inductors are used for adjusting an inductance of a primary inductive path so that a resonant current having a definite frequency is supplied to the primary inductive path independently of a length of the primary inductive path which is connected to the power supply. The length of the primary inductive path is determined dependently on a length of the moving path for the vehicles and so on.

However, the conventional contactless power distribution system having the configuration described above poses problems which are explained below.

In the constant-voltage control circuit of the conventional contactless power distribution system, electric charges accumulated in the pick-up coil which composes the resonant circuit together with the pick-up coil flow as an overcurrent to the switching circuit when the switching circuit is turned on, thereby posing a problem that a high thermal loss is caused due to switching loss of this switching element. Since the electric charges are accumulated in this capacitor while the switching element is turned off, a larger amount of electric charges are accumulated in the capacitor as the standard voltage is higher.

Further, since a number of the secondary electric power receiving circuits for receiving electric power from the primary inductive path to which the high-frequency current is supplied, i.e., a number of vehicles which can receive electric power from the primary inductive path, is inversely proportional to a square of a voltage applied to a load, there is posed a problem that it is obliged to reduce a number of vehicles which can receive electric power when the standard voltage is set at a high level.

Furthermore, the known dummy inductors pose a problem that they do not allow a high inductance to be reserved since they hardly allow gaps to be formed therein which increase a loss due to leakage flux and the ferrite cores have small sectional areas. Moreover, the ring-like ferrite cores which have small run-through slots pose a problem that they are inconvenient for passing the primary inductive path through centers of the cores and limit a number of passages of the primary inductive path through the ferrite cores. In addition, the ferrite cores constitute a noise source since the gaps in the ferrite cores produce sounds.

DISCLOSURE OF THE INVENTION

In order to solve these problems, a primary object of the present invention is to provide a contactless power distribution system which uses dummy inductors allowing a high inductance to be reserved, facilitating to pass a primary inductive path therethrough and reducing noise, is capable of reducing thermal loss and allows a large number of secondary electric power receiving circuits to receive electric power from a primary inductive path.

For accomplishing this object, the contactless power distribution system according to the present invention comprises a primary inductive path which is supplied with a high-frequency current and laid along a moving path for moving bodies, and secondary electric power receiving circuits which are supplied with electric power from the primary inductive path in a contactless mode and disposed in the moving bodies, and is characterized in that it uses an inductor for adjusting an inductance of the primary inductive path, and the inductor is composed by overlapping a plurality of planar ferrite cores with one another while reserving gaps therebetween so as to form a plurality of ferrite blocks and combining these ferrite blocks so as to form a run-through slot for passing the primary inductive path through centers thereof.

The configuration described above makes it possible to reserve a high inductance since a total gap is widened by reserving the plurality of gaps and a sectional area is enlarged since a sectional area of an inductor is composed of surfaces of the ferrite cores. Further, the configuration permits optionally setting a size of the run-through slot for passing the primary inductive path.

Further, the contactless power distribution system according to the present invention comprises a primary inductive path which is supplied with a high-frequency current and laid along a moving path for moving bodies, and secondary electric power receiving circuits which are supplied with electric power from the primary inductive path in a contactless mode and disposed in the moving bodies, and characterized in that the secondary electric power receiving circuit is composed of a coil disposed in opposition to the primary inductive path, a capacitor which composes, together with this coil, a resonant circuit which resonating with a frequency in the primary inductive path, a rectifier circuit which is connected to this capacitor, and a constant-voltage control circuit which is connected to this rectifier circuit, controls an output voltage to a standard voltage and supplies it to a load, and that the secondary power receiving circuit uses means for setting the standard voltage of the constant-voltage control circuit stepwise in proportion to an electric power supplied to the load.

Since electric charges accumulated in the capacitor flow into the constant-voltage control circuit and are lost when the constant-voltage control circuit operates and the electric charges are accumulated in the capacitor in an amount dependent on the standard voltage, loss caused by operating the constant-voltage control circuit is dependent on the standard voltage. Accordingly, the configuration described above makes it possible to reduce the loss and supply electric power to a large number of the secondary electric power receiving circuits from the primary inductive path by setting the standard voltage dependently on the electric power required for loads.

DESCRIPTION OF THE EMBODIMENT

Figure 6:
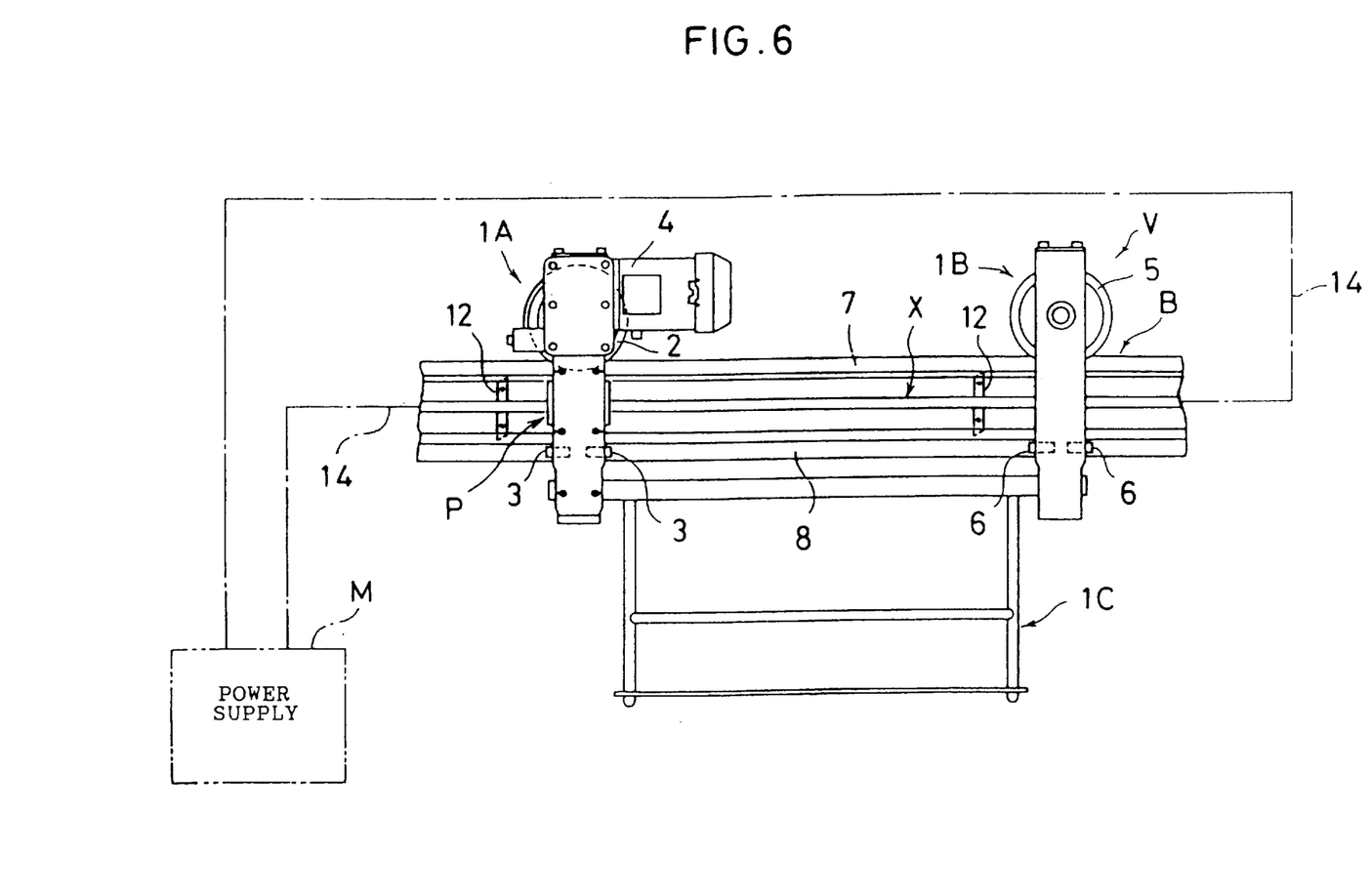
FIG. 6 is a side view illustrating a vehicle and a guide rail used in the contactless power distribution system shown in FIG. 1.
Figure 7:
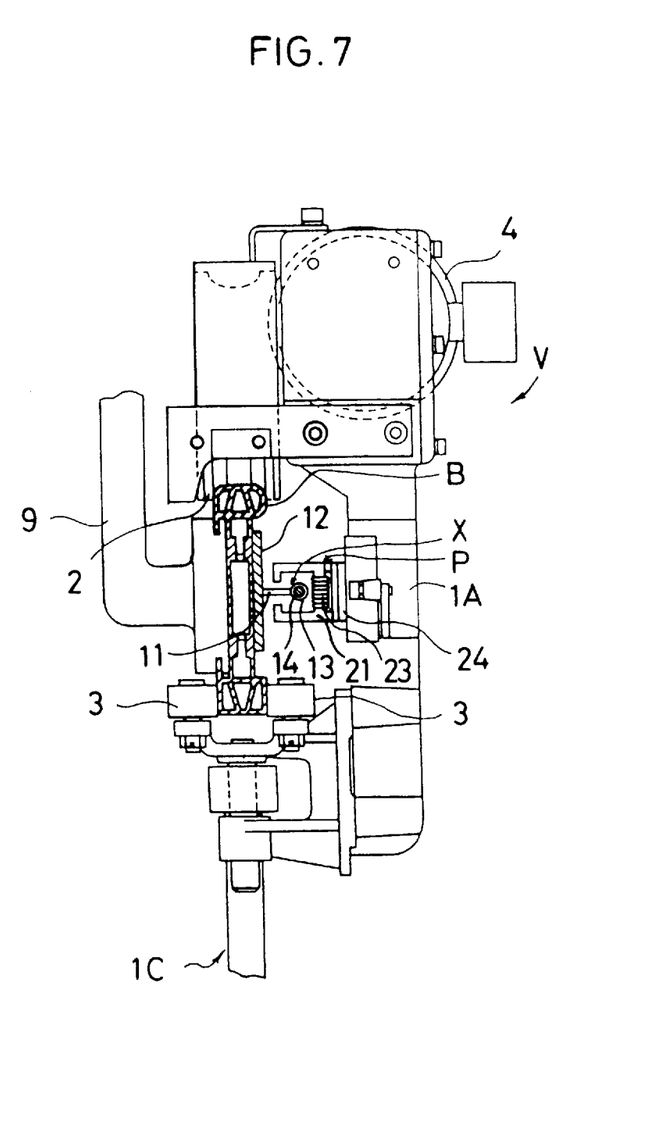
FIG. 7 is a partial sectional front view illustrating the vehicle and the guide rail used in the contactless power distribution system shown in FIG. 1.

A conveying car body (an example of moving body) V is composed of a driving trolley 1A, a follower trolley 1B and an article conveying carrier 1C which is supported by these trolleys 1A and 1B, and a guide rail B (an example of moving path) is disposed as shown in FIGS. 6 and 7 for guiding the car body V so as to be freely movable.

The driving trolley 1A is equipped with a travelling wheel 2 which engages with a top portion of the guide rail B, side anchor rollers 3 which are in contact with a lower portion of the guide rail B from both sides, a pick-up unit P and an electric motor 4 with a reduction gear for driving the travelling wheel 2. Further, the follower trolley 1B is equipped with a travelling wheel 5 which engages with the top portion of the guide rail B and side anchor rollers 6 which are in contact with the lower portion of the guide rail B from both the sides.

Furthermore, a wheel guide 7 is disposed on the top portion of the guide rail B and a roller guide 8 is disposed under the lower portion of the guide rail B. The guide rail B is sustained in a suspended condition with a sustaining frame 9 attached to one side and a inductive path unit X is attached to the side other than the side to which the sustaining frame 9 is attached.

Figure 8A:
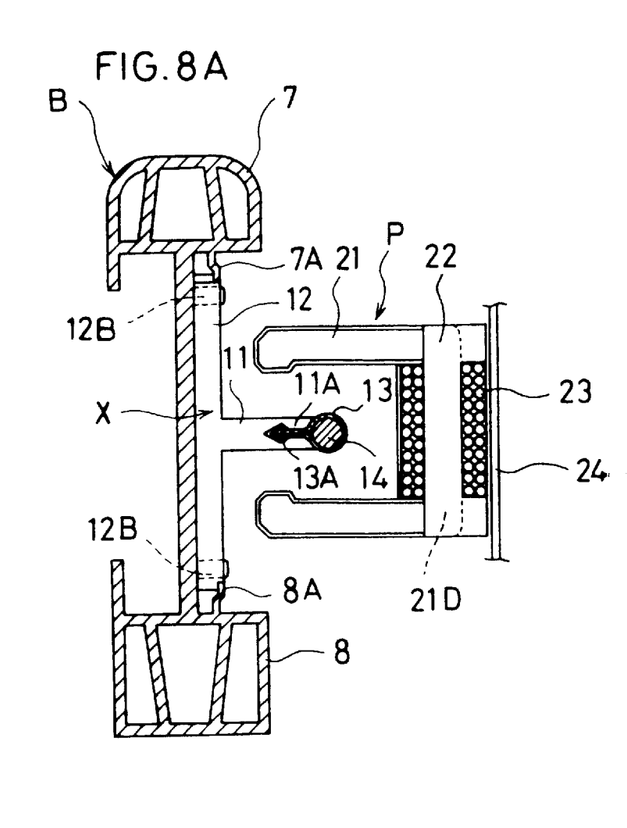
FIGS. 8A and 8B are a side view and a plan view illustrating a bracket used in the contactless power distribution system shown in FIG. 1.
Figure 8B:
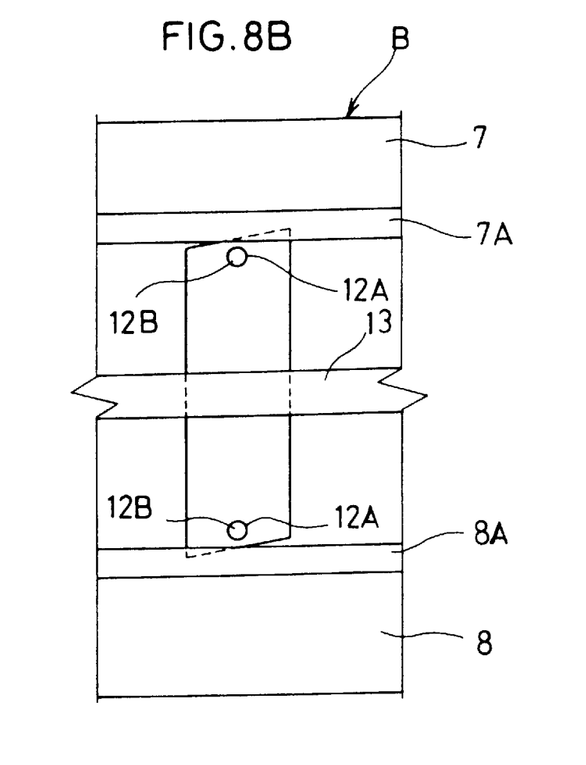
Figure 9A:
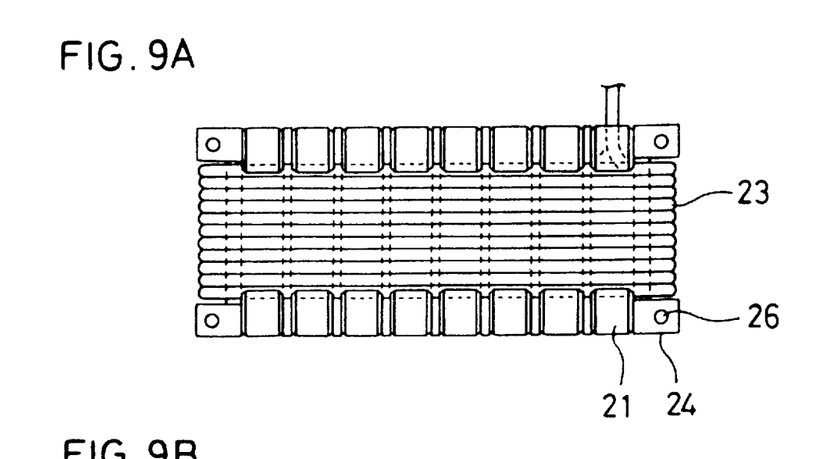
FIGS. 9A through 9C are a plan view, a front view and a side view illustrating a pick-up coil used in the contactless power distribution system shown in FIG. 1.
Figure 9B:
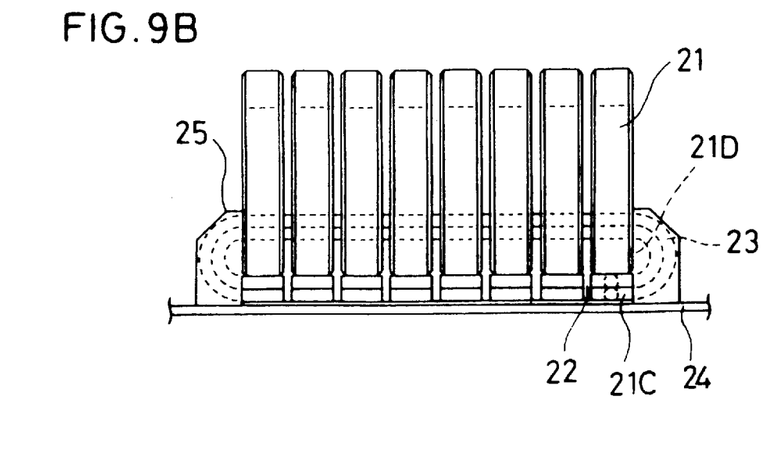
Figure 9C:
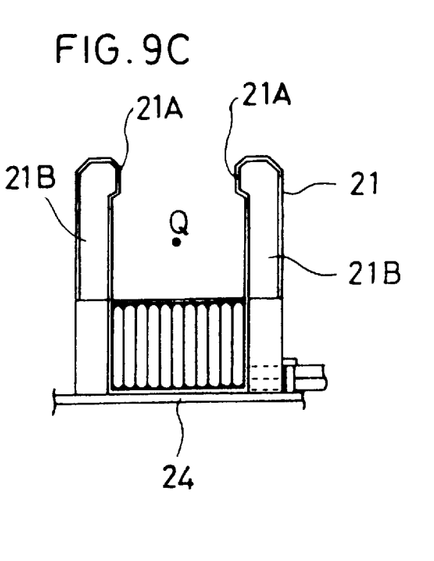

The inductive path unit X is composed, as shown on an enlarged scale in FIGS. 8A and 8B, of brackets 12 which have hangers 11 protruding perpendicularly therefrom and are disposed at predetermined intervals on one side of the guide rail B or along the guide rail B, a loop-like primary inductive path 14 which has a staring end and a terminal end connected to a power supply M, and a cover 13 in which the primary inductive path 14 is fitted in a longitudinal direction, and the primary inductive path 14 is laid along the guide rail B by inserting claws 13A of the cover 13 into bag-like concavities 11A disposed at tips of the hangers 11. The bracket 12 is fixed to the guide rail B by fitting its upper and lower ends inside claws 7A and 8A which protrude inward from the wheel guide 7 and the roller guide 8 of the guide rail B, screwing setscrews 12B into tapped holes 12A formed in the upper and lower ends so as to make its tips eat into the guide rail B. Accordingly, the hanger 11 protrudes horizontally from the side of the guide rail B.

Furthermore, the primary inductive path 14 is composed by covering a stranded wire (hereinafter referred to as a litz wire) formed by collecting thin insulated strands, for example, with a resin material.

Moreover, the pick-up unit P is composed, as shown in FIGS. 8A through 9C, of eight ferrite pieces 21 which have a "U-shaped" section, convexities 21A formed on tips thereof so as to be opposed to each other in openings and legs 21 formed at both outside ends of sides 21B, and are disposed sideways (in a direction along the guide rail B in FIG. 6) by way of spacers 22 having a "U-shaped" section, a pick-up coil 23 which is formed by winding the litz wire across both ends 21D of the ferrite pieces 21, for example, by scores of turns, and a planar back plate 24 which is attached to the legs 21C of the ferrite pieces 21. Further, end blocks 25 for retaining both sides of the pick-up coil 23 protruding from the ferrite pieces 21 are disposed on the back plate 24 and mounting holes 26 are formed at the four corners.

The pick-up unit P is fixed to a side of the car body V which is located on a side of the guide rail B in a condition where the pick-up coil 23 is set along the primary inductive path 14, the "U-shaped" opening of the ferrite block 21 is opposed to a side of the guide rail B and the primary inductive path 14 is located at a center Q thereof as shown in FIG. 8A. When the pick-up unit P is fixed as described above, the hanger 11 is located at a center of the "U-shaped" opening of the ferrite piece 21. When a current (AC) is supplied to the primary inductive path 14, an electromotive force is generated in the pick-up coil 23. Further, the planar back plate 24 made of a magnetic field shielding material shields useless magnetic flux induced outward from a side 21D of the ferrite pieces 21D and lower inductance for efficient generation of the electromotive force.

Figure 1:
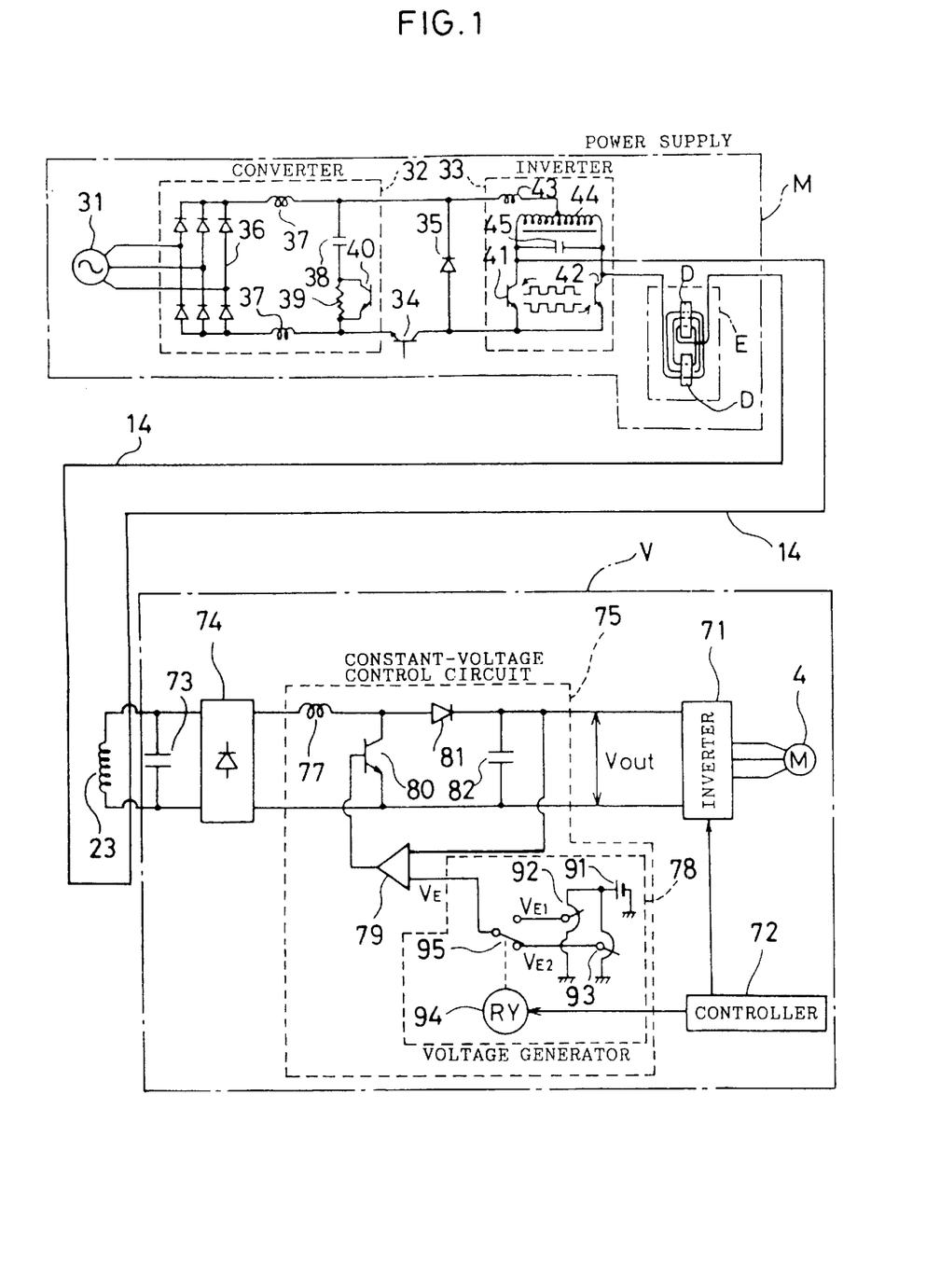
FIG. 1 is a circuit diagram illustrating an embodiment of the contactless power distribution system according to the present invention.

A circuit composition for the power supply M and the car body V is shown in FIG. 1.

The power supply M is composed of an AC 200 V, three-phase power source 31, a converter 32, a sinusoidal wave resonant inverter 33, a transistor 34 and a diode 35 which serve for protection from overcurrent, and an inductance adjuster E.

The converter 32 is composed of a full-wave rectification diode 36, a coil 37, a capacitor 38 and a resistor 39 which compose a filter, and a transistor 40 for shorting the resistor 39.

Further, the sinusoidal wave resonant inverter 33 is composed of transistors 41 and 42 which are driven alternately with rectangular wave signals shown in the drawing, a current limiting coil 43, a current supplying coil 44 connected to the transistors 41 and 42, and a capacitor 45 which composes a resonant circuit having a predetermined frequency together with the primary inductive path 14 and two dummy inductors D of the inductance adjuster E. A transistor controller is omitted in FIG. 1.

The dummy inductor D mentioned above is composed, as shown in FIGS. 2A through 3B, of a plate 51, a rectangular casing 53 which is attached to the plate 51 and has a rectangular horizontal run-through slot 52 formed at a center thereof for passing the primary inductive path 14, and a plurality of ferrite cores which are disposed and assembled in a frame consisting of the plate 51 and the casing 53, and then molded with resin. The casing 53 is composed of a bottom plate 53A which has a rectangular hole formed at a center thereof, four side plates 53B which are studded around the rectangular hole of the bottom plate 53A so as to form the horizontal run-through slot 52 and three side plates 53C which are studded along the bottom plate 53A for composing the casing together with the plate 51.

Figure 2A:
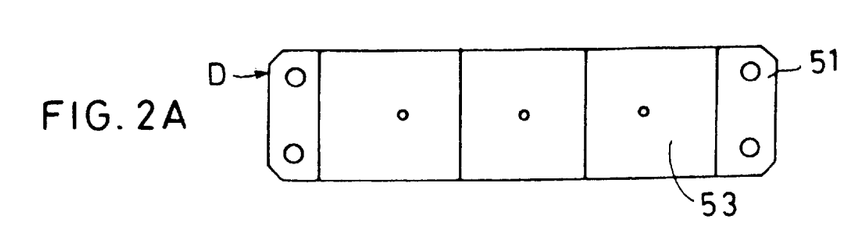
FIGS. 2A through 2C are diagrams illustrating an outside form of an inductor used in the contactless power distribution system shown in FIG. 1.
Figure 2B:
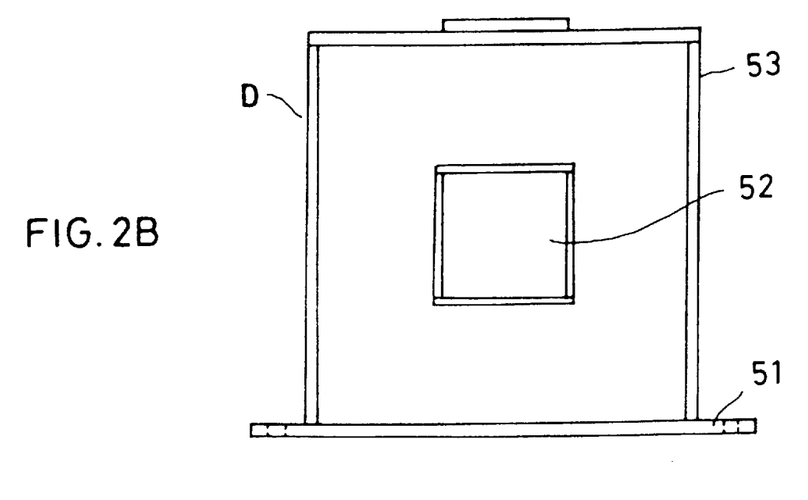
Figure 2C:
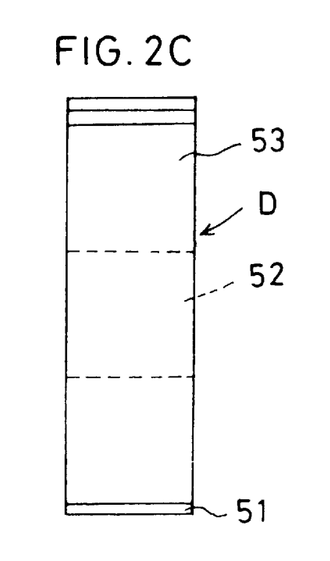
Figure 3A:
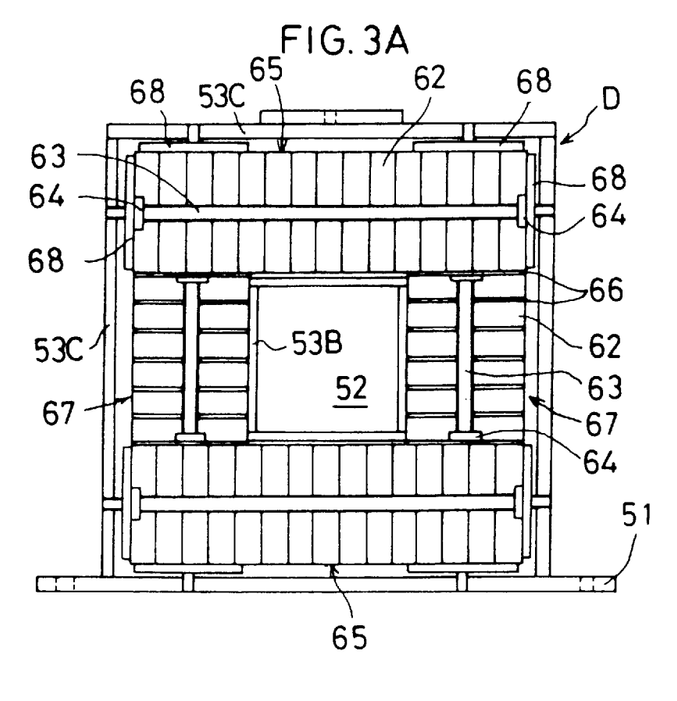
FIGS. 3A and 3B are assembly drawings of the inductor used in the contactless power distribution system shown in FIG. 1.
Figure 3B:
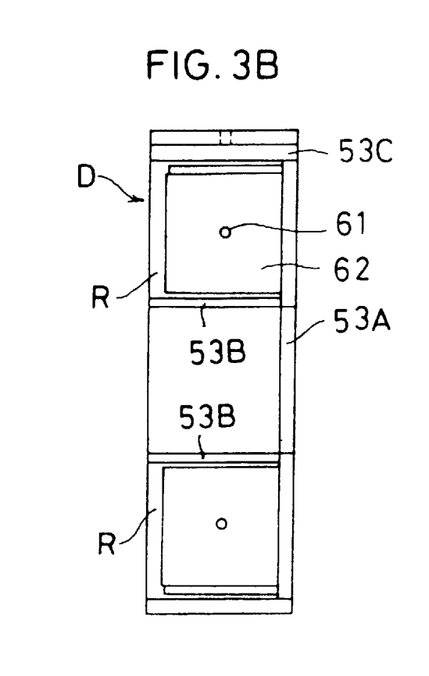

A manufacturing method of this dummy inductor D will be described below together with a detailed composition thereof.

1. First, a pair of upper and lower ferrite blocks 67 are formed by overlapping a plurality of planar ferrite cores 62 having run-through slots 61 formed at centers thereof, and fixing them with bars 63 passing through the run-through slots 61 and retaining members 64.
2. Then, a pair of right and left ferrite blocks 67 are formed by overlapping the ferrite cores 62 alternately with gap members 66 which have run-through slots formed at centers thereof and are made of a non-magnetic material, and fixing them with the bars 63 passing through the run-through slots 61 and the retaining members 64.
3. The right and left ferrite blocks 67 are disposed on the bottom plate 53B on which the side plates 53A are studded by interposing the right and left ferrite blocks between the upper and lower ferrite blocks so that the gap members 66 are located at both ends of the upper and lower ferrite blocks.
4. Then, the ferrite blocks 65 and 67 are fixed by assembling the plate 51 and the three side plates 53C of the casing 53 on the top, bottom, right and left sides of the upper and lower ferrite plates 65 by way of supporting plates 68.
5. Subsequently, resin R is flowed into the casing for molding.

The configuration described above allows the dummy inductor D to have a high inductance since the configuration allows the dummy inductor D to have a plurality of gaps which are formed by sandwiching the plurality of gap members 66 between the ferrite cores 62 and a sectional area which is formed as an area of planar surfaces of the ferrite cores can be larger than that of the conventional dummy inductor. Further, this configuration permits optionally setting a size of the horizontal run-through slot 52 for passing the primary inductive path 14, thereby facilitating to pass the primary inductive path 14 and making it possible to pass a plurality of primary inductive paths 14.

Furthermore, the configuration permits selecting an optional number of the gap members 66 to be sandwiched between the ferrite cores 62, thereby making it possible to adjust inductance. Furthermore, the configuration makes it possible to reduce noise by molding the dummy inductor as a whole. Moreover, the configuration can facilitate to assemble the dummy inductor by accommodating the ferrite cores 62 in a frame member and allows gaps to be formed easily between the ferrite cores, thereby enhancing an efficiency for assembling works.

Figure 4A:
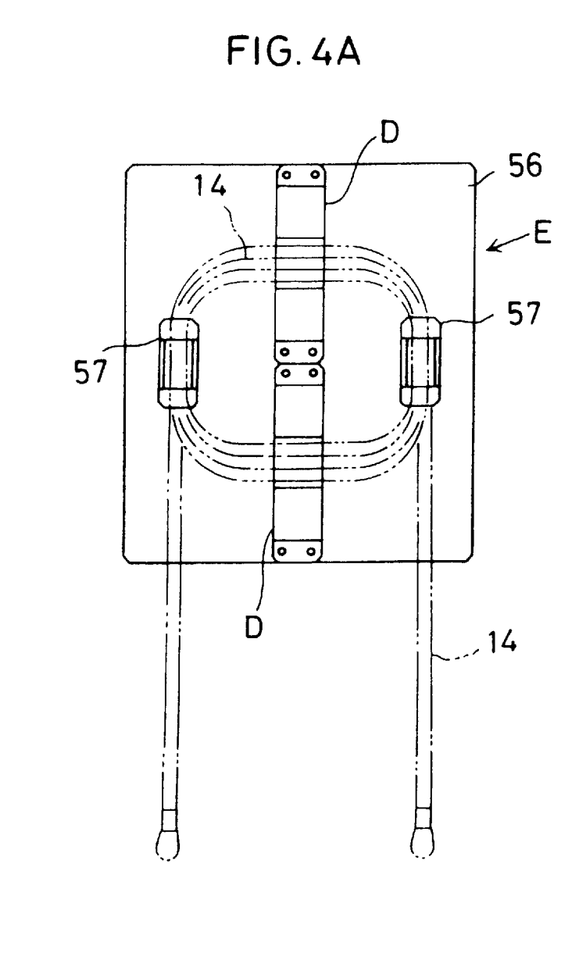
FIGS. 4A and 4B are diagrams illustrating an outer form of an inductance adjuster which employs the inductor used in the contactless power distribution system shown in FIG. 1.
Figure 4B:
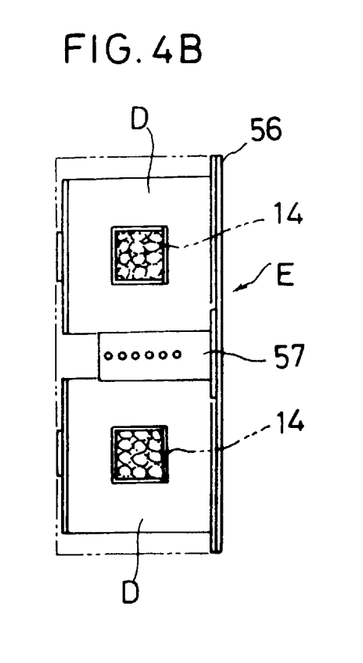

In the inductance adjuster E which uses the two dummy inductors D, a pair of cable holders 57 which can support a plurality of primary inductive paths 14 are disposed in opposition to each other on a mounting plate 56 and a pair of dummy inductors D are disposed with the horizontal run-through slot 52 positioned so as to pass a plurality of primary inductive paths 14 which are supported by these cable holders 57. In the inductance adjuster E, the primary inductive path 14 passes a plurality of times through each of the two dummy inductors D.

Owing to inductance adjustment performed by the inductance adjuster E, it is possible to adjust a resonance frequency of the primary inductive path 14 to a predetermined resonance frequency. That is to say, since a rated voltage v at the starting end of the primary inductive path 14 is expressed as:

$$v = i \cdot 2\pi f \cdot (LC + LF)$$

an inductance LF corresponding to the dummy inductor D is expressed by the following formula (1):

$$LF = v/(i \cdot 2\pi f) - LC \tag{1}$$

wherein the reference symbol i represents a rated voltage of the primary inductive path 14, the reference symbol f designates a predetermined resonance frequency of the primary inductive path 14 and the reference symbol LC denotes an inductance of the primary inductive path 14.

Since the inductance LC of the primary inductive path 14 is determined by its length, it is sufficient for obtaining predetermined voltage, current and resonance frequency to adjust the inductance LF corresponding to the dummy inductor so as to satisfy the formula (1) mentioned above.

A combination of the power supply M and the primary inductive path 14 described above supplies a high-frequency sinusoidal wave current having the predetermined resonance frequency adjusted by the dummy inductor D independently of a length of the primary inductive path 14.

By adjusting an inductance with the dummy inductor D as described above, it is possible, without changing circuit constants of the power supply M, to set the primary inductive path 14 at the predetermined voltage, current and resonance frequency regardless of variations in length of the primary inductive path 14.

The secondary power receiving circuit of the contactless power distribution system is composed, as shown in FIG. 1, of a pick-up coil 23, a capacitor 73 which composes together with the pick-up coil 23 a resonant circuit resonating with a frequency of the primary inductive path 14, a rectifier circuit 74 connected to the capacitor 73, and a constant-voltage circuit 75 which is connected to the rectifier circuit 74 and controls an output voltage VOUT to a standard voltage VE. An electric motor 4 which functions as a load is connected to the constant-voltage control circuit by way of an inverter 71 and receives electric power from the constant-voltage control circuit 75.

The constant-voltage control circuit 75 is composed of a current limiting coil 57, a voltage generator 78 for generating the standard voltage VE, a comparator 79 which compares the output voltage VOUT with the standard voltage VE of a voltage generator 78, an output adjusting transistor 80 which is turned on by the comparator for turning off the output voltage VOUT when this voltage exceeds the standard voltage VE, and a diode 81 and a capacitor 82 which compose a filter.

The voltage generator 78 is composed of a battery 91, two standard voltage generators 92 and 93 consisting of variable resistors connected to the battery 91, and a relay 94 and its contact 95 which select either of standard voltages VE1 and VE2 (VE1>VE2) generated by the standard voltage generators 92 and 93, and outputs the standard voltage VE1 or VE2 selected by the relay 94 (contact 95) as the standard voltage. For example, DC 300 V and DC 100 V are generated as the standard voltage VE1 and the standard voltage VE2 respectively. The standard voltage VE1 corresponds to the standard voltage generated by the voltage generator used in the conventional example.

Further, a controller 72 which outputs a drive command signal for a motor 4 to the inverter 71 is disposed in the inverter 71. This controller 72 outputs an excitation signal for the relay 94 simultaneously with the command signal to the inverter 71. The excitation signal for the relay 94 is used as a signal representing a condition of use of the load (motor 4).

Setting means is composed of the battery 91, the standard voltage generators 92 and 93, the relay 94, its contact 95, and the controller 72.

Description will be made of functions of the secondary electric power receiving circuit of the car body V.

A sinusoidal wave current having a high frequency, for example, of 10 kHz is supplied from the power supply M to the primary inductive path 14, a magnetic flux produced in the primary inductive path 14 generates a large electromotive force in the pick-up coil 23 which resonates with a frequency in the primary inductive path 14, and an AC current produced by the electromotive force is rectified by the rectifier circuit 74, controlled to the standard voltage VE by the constant-voltage control circuit 75 and supplied to the inverter 71.

At this time, a drive command signal is output from the controller 72 to the inverter 71. When an excitation signal is output to the relay 94, the standard signal VE1 generated by the standard voltage generator 92 is selected as the standard voltage VE and compared with the output voltage VOUT by the comparator 79, and the output voltage VOUT is controlled to the standard voltage VE1. In correspondence to the drive command signal, the inverter 71 supplies electric power to the motor 4 and the motor 4 rotates, thereby running the car body V and increasing a load electric power.

When the drive command signal output from the controller 72 to the inverter 71 is turned off and the excitation signal is not output to the relay 94 any longer, the standard voltage VE2 generated by the standard voltage generator 93 is selected as the standard voltage VE, compared with the output voltage VOUT by the comparator 79, and the output voltage VOUT is controlled to the standard voltage VE2. The inverter 71 stops supplying the electric power to the motor 4 for stopping the motor 4, thereby stopping the car body V and decreasing the load electric power.

Figure 5:
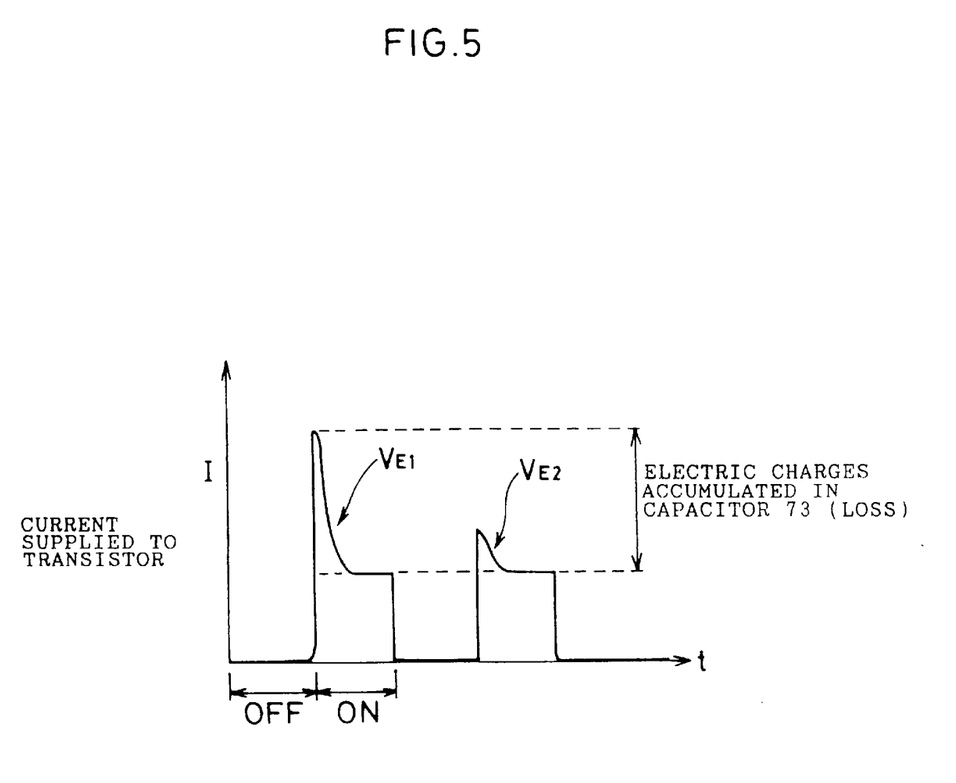
FIG. 5 is a curve graph illustrating characteristics of currents which are supplied to a transistor while it is turned on and off in a constant-voltage control circuit used in the contactless power distribution system shown in FIG. 1.

An overcurrent which is supplied to the transistor 80 when it is turned on is made lower as the standard current VE is lower as illustrated in FIG. 5 by selecting the higher standard voltage VE1 while the motor 4 is being driven to enhance a load electric power or the lower standard voltage VE2 while the motor 4 is stopped to lower the load electric power. It is therefore possible to make a switching loss lower than that in the conventional inductive power distribution system where the standard voltage VE is always kept at a constant level of the standard voltage VE1. That is to say, it is possible to reduce a loss by setting a standard voltage dependently on a load electric power since a loss caused by operating the constant-voltage control circuit 75 is dependent on electric charges accumulated in the capacitor 73 and the electric charges accumulated in the capacitor 73 are dependent on the standard voltage.

Further, since a number of secondary electric power receiving circuits which receive electric power from the primary inductive path 14, i.e., number of car bodies which are capable of receiving electric power from the primary inductive path 14, is inversely proportional to a square of the voltage VOUT applied to load, it is possible by setting the standard voltage at a lower level to enlarge the number of the car bodies which are capable of receiving electric power from the primary inductive path 14.

Though the embodiment of the present invention is configured to generate the standard voltage at the two steps while judging a load electric power dependently on conditions of use of loads, the standard voltage VE may be changed dependently on preestimated load electric powers or standard voltages may be generated in a number of a plurality of load electric powers when the plurality of load electric powers are preestimated.

Further, it is possible to reserve gaps in the upper and lower ferrite blocks 65 by sandwiching the gap members 66 between the ferrite cores 62 in the upper and lower ferrite blocks 65 though gaps are not reserved in the upper and lower ferrite blocks 65 in the dummy inductor D adopted for the embodiment of the present invention.

Furthermore, though the inductance adjuster E is connected to the starting end of the primary inductive path 14 in the embodiment of the present invention, it is needless to say that the inductance adjuster E may be disposed in the course of the primary inductive path 14, at the terminal end thereof or at any optional location.

What is claimed is:

1. A contactless power distribution system comprising a
primary inductive path which is laid along a moving path for moving bodies and passes a high-frequency current, and
secondary electric power receiving circuits which are disposed in said moving bodies and receive electric power from said primary inductive path in a contactless mode,
characterized in that said contactless power distribution system uses an inductor for adjusting inductance in said primary inductive path, and said inductor is composed by overlapping a plurality of planar ferrite cores while reserving gaps so as to form a plurality of ferrite blocks and combining these ferrite blocks so as to form at centers thereof a run-through slot for passing said primary inductive path.

2. A contactless power distribution system according to claim 1 wherein said ferrite blocks of the inductor are configured to permit optionally changing a number of gaps reserved between the ferrite cores.

3. A contactless power distribution system according to claim 1 wherein said ferrite blocks of the inductor are molded with resin.

4. A contactless power distribution system according to claim 1 wherein said ferrite cores of the inductor are accommodated in a frame body and said frame body is configured to maintain the gaps between said ferrite cores.

5. A contactless power distribution system comprising a primary inductive path which is laid along a moving path for moving bodies and passes a high-frequency current, and secondary electric power receiving circuits which are disposed in said moving bodies and receive electric power from said primary inductive path in a contactless mode, characterized in that said secondary electric power receiving circuit is composed of a coil disposed in opposition to said primary inductive path, a capacitor which is connected to said coil and composes, together with said coil, a resonant circuit resonating with a frequency in said primary inductive path, a rectifier circuit connected to said capacitor, and a constant-voltage control circuit which is connected to said rectifier circuit, controls an output voltage to a standard voltage and supplies it to a load, and said contactless power distribution system includes setting means which sets the standard voltage of said constant-voltage control circuit stepwise in proportion to an electric power for said load.

6. A contactless power distribution system according to claim 5 wherein said setting means sets the standard voltage at two steps by judging a load electric power in use for the load.

* * * * *

UNITED STATES PATENT AND TRADEMARK OFFICE
CERTIFICATE OF CORRECTION

PATENT NO.  : 5,831,841
DATED       : November 3, 1998
INVENTOR(S) : Shuzo Nishino It is certified that error appears in the above-indentified patent and that said Letters Patent is hereby corrected as shown below:

On the title page item [73], Assignee:  change "Diafuku" to "Daifuku".

Signed and Sealed this

Second Day of March, 1999

*Attest:*

Q. TODD DICKINSON

*Attesting Officer*   *Acting Commissioner of Patents and Trademarks*